United States Patent [19]

Sato

[11] Patent Number: 5,178,343
[45] Date of Patent: Jan. 12, 1993

[54] CHANGE SPEED APPARATUS FOR A FISHING REEL

[75] Inventor: Jun Sato, Sakai, Japan

[73] Assignee: Shimano Industrial Co., Ltd., Osaka, Japan

[21] Appl. No.: 642,784

[22] Filed: Jan. 18, 1991

[30] Foreign Application Priority Data

Jan. 20, 1990 [JP] Japan .................................. 2-10983

[51] Int. Cl.$^5$ .......................................... A01K 89/015
[52] U.S. Cl. ................................ 242/255; 74/421 R; 242/298
[58] Field of Search .............. 242/255, 268, 298, 249; 74/411.5, 414, 421 R

[56] References Cited

U.S. PATENT DOCUMENTS

| 703,614 | 7/1902 | Rock | 74/421 R |
|---|---|---|---|
| 2,335,752 | 11/1943 | Geiger | 242/255 |
| 2,417,732 | 3/1947 | Bland et al. | 242/255 |
| 2,517,776 | 8/1950 | Feierabend | 242/255 |
| 2,918,227 | 12/1959 | Mavborgne | 242/255 X |
| 4,566,655 | 1/1986 | Young | 242/255 |
| 4,867,392 | 9/1989 | Sato | 242/255 |
| 4,871,129 | 10/1989 | Hashimoto | 242/255 |
| 4,927,095 | 5/1990 | Young | 242/255 |
| 4,951,899 | 8/1990 | Moosberg | 242/255 |
| 4,966,335 | 10/1990 | Kaneko | 242/255 |
| 5,110,066 | 5/1992 | Toda | 242/255 |

FOREIGN PATENT DOCUMENTS

| 1-277441 | 4/1988 | Japan . |
|---|---|---|
| 766157 | 1/1957 | United Kingdom . |
| 770420 | 6/1957 | United Kingdom . |

Primary Examiner—Daniel P. Stodola
Assistant Examiner—Tony A. Gayoso
Attorney, Agent, or Firm—Dickstein, Shapiro & Morin

[57] ABSTRACT

A change speed apparatus for a fishing reel comprises a plurality of sun gears having different numbers of teeth, an input shaft carrying one of the sun gears and rotatable by a handle, an output shaft connected to a spool and carrying the other sun gear, a differential gear including toothed portions having different numbers of teeth for meshing with the plurality of sun gears, a gear holder for supporting the differential gear, a first transmission line for restricting rotation of the gear holder to transmit drive from the input shaft to the output shaft through the differential gear, a second transmission line for rendering the gear holder rotatable to directly couple the input shaft and the output shaft, and a transmission switching mechanism for selecting between the first transmission line and the second transmission line.

20 Claims, 7 Drawing Sheets

CHANGE SPEED APPARATUS FOR A FISHING REEL

BACKGROUND OF THE INVENTION

1. Field of the Invention

This invention relates to a change speed apparatus for a fishing reel, and more particularly to a fishing reel in which a fishing line takeup member such as a spool is driven in varied speeds.

2. Description of the Prior Art

A known fishing reel of this type is disclosed in Japanese Patent Publication Kokai No. 1989-277441, for example. The construction proposed in this publication comprises a handle-rotatable sleeve rotatable by a handle, and an output shaft rotatably supported in the sleeve and having a main gear. A planetary gear mechanism is provided which includes a sun gear mounted on the output shaft, planet gears supported on the handle-rotatable sleeve and meshed with the sun gear, and a ring gear rotatably supported on a reel body and having internal teeth meshed with the planet gears. The reel body has a stopper pawl engageable with engaging teeth defined peripherally of the ring gear. When the handle is turned in a direction to wind up a fishing line with the stopper pawl engaging one of the engaging teeth to lock the ring gear against rotation, the handle-rotatable sleeve is rotated, and the output shaft having the sun gear is rotated in acceleration with the planet gears rotating, whereby the spool is driven at high speed through the main gear. On the other hand, when the handle is turned in the direction to wind up the fishing line with the stopper pawl disengaged from the engaging teeth to render the ring gear rotatable, the handle-rotatable sleeve is directly connected, for unitary rotation, to the output shaft through a one-way rotation drive mechanism. At this time, the ring gear meshed with the planet gears follows rotation of the sun gear, to be free from the accelerating action of the planetary gear mechanism, whereby the spool is driven at low speed through the main gear.

Where the speed is changed by using a planetary gear mechanism as above, the speed ratio between high speed and low speed may be reduced by reducing the pitch diameter of the planet gears. However, there is a limitation to reduction of the pitch diameter of the planet gears by reason of the strength of the planet gears. Consequently, only a limited freedom is allowed for selecting a gear ratio, and the speed ratio cannot be reduced below a certain value. The above construction has a further disadvantage of being costly since it is very difficult to shape the internal teeth of the ring gear with high precision.

SUMMARY OF THE INVENTION

The present invention has been made having regard to the problems of the prior art noted above. It is an object of the present invention to provide an inexpensive change speed apparatus for a fishing reel which effects acceleration and deceleration both in a directly coupled state without using a planetary gear mechanism, allows an increased freedom for selecting a speed ratio between high speed and low speed, and allows the gear ratio to be reduced below a certain value.

The above object is fulfilled, according to the present invention, by a change speed apparatus for a fishing reel comprising a plurality of sun gears having different numbers of teeth, an input shaft carrying one of the sun gears and rotatable by a handle, an output shaft connected to a spool and carrying the other sun gear, a differential gear including toothed portions having different numbers of teeth for meshing with the plurality of sun gears, a gear holder for supporting the differential gear, a first transmission line in which rotation of the gear holder is restricted to transmit drive from the input shaft to the output shaft through the differential gear, a second transmission line in which the gear holder is rotatable to directly couple the input shaft and the output shaft, and a transmission switching mechanism for selecting between the first transmission line and the second transmission line.

According to this change speed apparatus, rotation of the gear holder is restricted when the first transmission line is selected by the transmission switching mechanism. When, in this state, the handle is turned in a fishing line winding direction, the input shaft is rotated with the handle, and drive is transmitted from the input shaft to the output shaft with acceleration or deceleration through the respective sun gears and differential gear. When the second transmission line is selected by the transmission switching mechanism, the gear holder becomes rotatable whereby the drive is directly transmitted from the input shaft to the output shaft without passing through the differential gear.

In this way, a change speed operation is effected simply by operating the transmission switching mechanism. Moreover, since the differential gear is used, the output shaft may be accelerated or decelerated relative to the input shaft simply by varying the difference in the number of teeth between the tooth portions of the differential gear. This construction allows an increased freedom for selecting a speed ratio between high speed and low speed, with a gear ratio reduced below a certain value. In addition, the above construction does not use a ring gear having internal teeth, and therefore is low cost compared with the prior art having a ring gear.

The plurality of sun gears may comprise a first sun gear and a second sun gear, the toothed portion meshed with the first sun gear having a smaller number of teeth than the toothed portion meshed with the second sun gear, whereby rotation of the input shaft is transmitted with acceleration to the output shaft when the first transmission line is selected by the transmission switching mechanism.

According to this construction, when the first transmission line is selected by the transmission switching mechanism, turning of the handle in the line winding direction rotates the input shaft, and the differential gear is rotated through the first sun gear of the input shaft. Then the output shaft is rotated with acceleration to an extent corresponding to the difference in the number of teeth between the tooth portions of the differential gear, as compared with the output shaft being directly coupled with the input shaft when the second transmission line is selected. Consequently, a fishing line takeup member such as a spool may be driven at high speed.

Preferably, the transmission switching mechanism includes a one-way rotation transmitting mechanism for transmitting the rotation of the input shaft to the output shaft when the second transmission line is selected by the transmission switching mechanism.

This provides a simple construction for directly coupling the input shaft to the output shaft through the one-way rotation transmitting mechanism when the handle is turned after the second transmission line is selected to render the gear holder rotatable and the differential gear revolvable. That is, switching between direct coupling and acceleration may be effected by a simple operation to restrict or free the rotation of the gear holder.

On the other hand, the plurality of sun gears may comprise a first sun gear and a second sun gear, the toothed portion meshed with the first sun gear having a larger number of teeth than the toothed portion meshed with the second sun gear, whereby rotation of the input shaft is transmitted with deceleration to the output shaft when the first transmission line is selected by the transmission switching mechanism.

According to this construction, turning of the handle in the line winding direction rotates the input shaft, and the differential gear is rotated through the first sun gear of the input shaft. Then the output shaft is rotated with deceleration to an extent corresponding to the differnce in the number of teeth between the toothed portions of the differential gear, as compared with the output shaft being directly coupled with the input shaft when the second transmission line is selected. Consequently, the fishing line takeup member such as a spool may be driven at low speed.

Preferably, the transmission switching mechanism includes a stopper mechanism for restricting rotation of the gear holder when the first transmission line is selected by the transmission switching mechanism, and a direct coupling mechanism for directly coupling the input shaft and the output shaft when the second transmission line is selected by the transmission switching mechanism.

According to this construction, when the second transmission line is selected, the stopper mechanism restricts the rotation of the gear holder, and the direct coupling mechanism directly couples the input shaft and output shaft for unitary rotation. Thus, switching between direct coupling and deceleration may be effected by a simple operation.

DETAILED DESCRIPTION OF THE PREFERRED EMBODIMENTS

Figure 1:
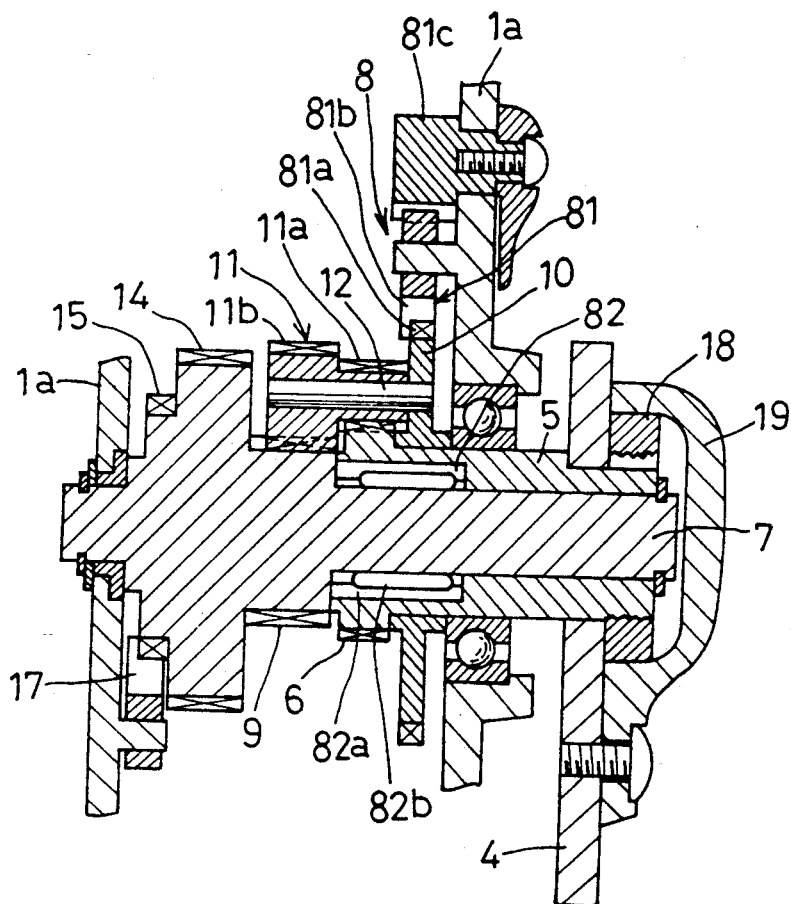
FIG. 1 is a sectional view of a principal portion of an accelerating system in one embodiment of the present invention.

Change speed apparatus for use in a fishing reel embodying the present invention will be described in detail hereinafter with reference to the drawings.

FIGS. 1 through 8 show embodiments that effect acceleration in a directly coupled state. In a first embodiment shown in FIGS. 1 through 3, a reel body 1 comprises side frames 1a and 1b opposed to each other in a spaced relationship, and a spool 3 rotatably supported by the reel body 1 through a spool shaft 2. A tubular input shaft 5 rotatable by operating a handle 4 extends parallel to the spool shaft 2 and includes a first sun gear 6 formed integral with one end thereof. The input shaft 5 has an output shaft 7 rotatably fitted therein and rotatably supported at an end by the side frame 1a. The output shaft 7 carries a second sun gear 9 formed integral with an intermediate position and having a smaller number of teeth than the first sun gear 6. The input shaft 5 carries a gear holder 10 relatively rotatably mounted thereon and rotatably supporting, through a pivotal shaft 12, a differential gear 11 defining toothed portions 11a and 11b having different numbers of teeth for meshing with the first sun gear 6 and second sun gear 9. A transmission switching mechanism 8 is formed for selecting between a first transmission line in which rotation of the gear holder 10 is restricted and transmitting drive with acceleration from the input shaft 5 through the differential gear 11 to the output shaft 7, and a second transmission line in which the gear holder 10 is released to be rotatable and directly coupling the input shaft 5 to the output shaft 7.

Specifically, the toothed portion 11a of the differential gear 11 meshed with the first sun gear 6 has a smaller number of teeth than the toothed portion 11b meshed with the second sun gear 9. The transmission switching mechanism 8 includes a restricting mechanism 81 for restricting or freeing rotation of the gear holder 10, and a one-way rotation transmitting mechanism 82 for providing the second transmission line. The rotation of the gear holder 10 is restricted by the restricting mechanism 81 to rotate the differential gear 11, thereby transmitting the rotation of the input shaft 5 with acceleration to the output shaft 7. When the gear holder 10 is freed from the restriction by the restricting mechanism 81, the differential gear 11 becomes rotatable with the gear holder 10, and the output shaft 7 is directly coupled to the input shaft 5 through the one-way rotation transmitting mechanism 82.

Figure 2:
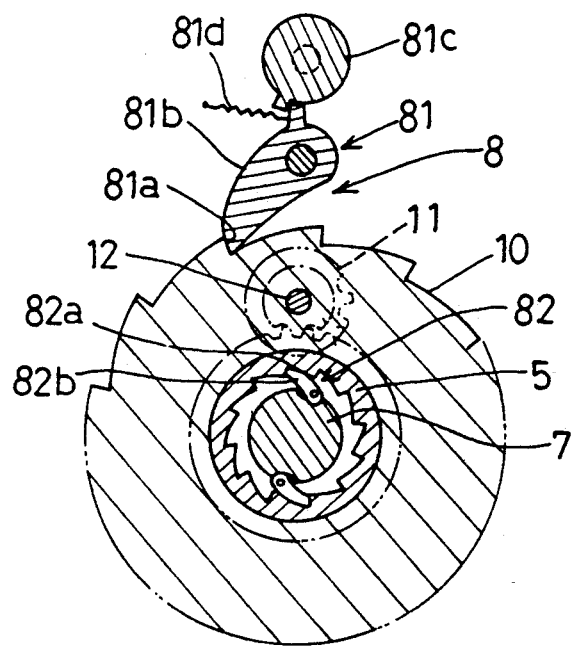
FIG. 2 is a section taken on line II—II of FIG. 1.

The restricting mechanism 81 is disposed between the gear holder 10 and side frame 1a, and includes ratchet teeth 81a formed peripherally of the gear holder 10, a restricting pawl 81b engageable with the ratchet teeth 81a to restrict rotation of the gear holder 10 in a direction to wind up a fishing line, and a control element 81c for controlling the restricting pawl 81b from outside the side frame 1a. The restricting pawl 81b and control element 81c are supported by the side frame 1a. A spring 81d is mounted between the restricting pawl 81b and side frame 1a for urging the restricting pawl 81b toward the ratchet teeth 81a. The control element 81c is rotatable counterclockwise in FIG. 2 to disengage the restricting pawl 81b from the ratchet teeth 81a, thereby rendering the gear holder 10 rotatable. In this state, the input shaft 5 and output shaft 7 are directly coupled to each other through the one-way rotation transmitting mechanism 82. When the control element 81c is turned clockwise to engage one of the ratchet teeth 81a as shown in FIG. 2, the gear holder 10 is locked against rotation. In this state, the differential gear 11 is rotatable to transmit rotation of the input shaft 5 with acceleration to the output shaft 7.

The one-way rotation transmitting mechanism 82 is provided between the input shaft 5 and output shaft 7, and includes ratchet teeth 82a defined on an inside periphery of the input shaft 5 and transmission pawls 82b engageable with the ratchet teeth 82a. The transmission pawls 82b are carried by the output shaft 7 to be raisable and retractable, and urged by pawl springs (not shown) toward the ratchet teeth 82a. Thus, when, as shown in FIG. 2, rotation of the gear holder 10 is restricted by the restricting pawl 81b of the restricting mechanism 81 engaging one of the ratchet teeth 81a, the output shaft 7 rotates at accelerated speed clockwise in FIG. 2 and the transmission pawls 82b are out of engagement with the ratchet teeth 82a. When the restricting pawl 81b is disengaged from the ratchet teeth 81a by operation of the control element 81c and the input shaft 5 rotates clockwise in FIG. 2, the transmission pawls 82b engage the ratchet teeth 82a and the output shaft 7 is directly coupled to the input shaft 5 through these ratchet teeth 82a and transmission pawls 82b.

The output shaft 7 includes, as integral parts thereof, a main gear 14, and a backward rotation stopper gear 15 for preventing rotation of the main gear 14 in a direction opposite to the line winding direction. The output shaft 7 is rotatably supported at one end thereof by the side frame 1a.

Figure 3:
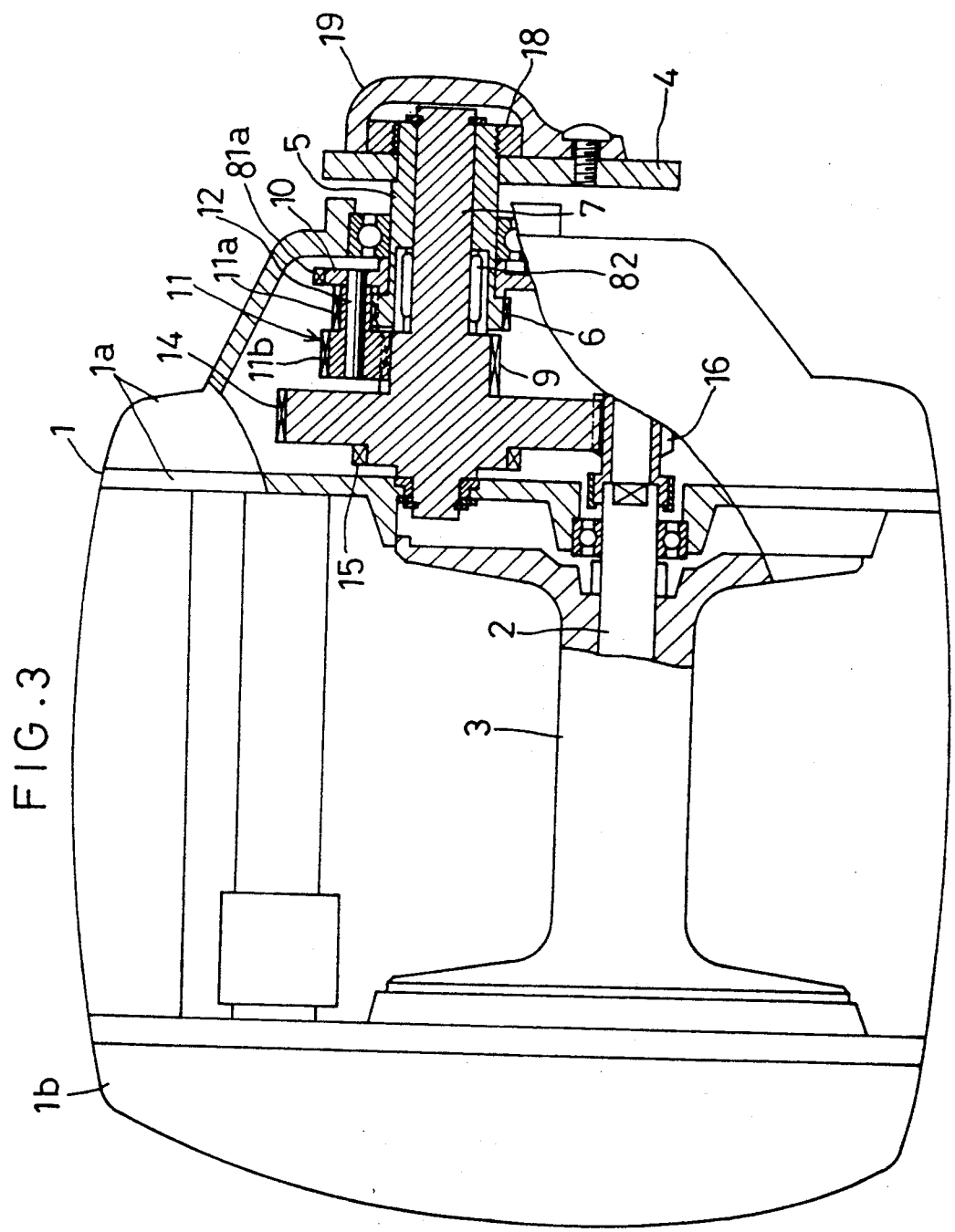
FIG. 3 is a view partly in section of an entire reel.

In FIGS. 1 through 3, numeral 16 denotes a pinion gear mounted on the spool shaft 2 and meshed with the main gear 14. Numeral 17 denotes a backward rotation stopper pawl engageable with the backward rotation stopper gear 15. Numeral 18 denotes a retainer nut for mounting the handle 4 to the input shaft 5. Numeral 19 denotes an element for keeping the retainer nut 18 tight.

For driving the spool 3 at high speed, the transmission switching mechanism 8 is operated to select the first transmission line. That is, the control element 81c is operated to engage the restricting pawl 81b of the restricting mechanism 81 with one of the ratchet teeth 81a of the gear holder 10 through the spring 81d. This engagement restricts rotation of the gear holder 10. When, in this state, the handle 4 attached to an end of the input shaft 5 is turned in the line winding direction, the input shaft 5 is turned with the handle 4, and the differential gear 11 is rotated through the first sun gear 6 of the input shaft 5. Then the output shaft 7 is rotated with acceleration relative to the rotation of the input shaft 5 to an extent corresponding to the difference in the number of teeth between the toothed portions 11a and 11b of the differential gear 11. The one-way rotation transmitting mechanism 82 provided in the second transmission line for directly coupling the input shaft 5 and output shaft 7 is placed in an inoperative state by the accelerated rotation of the output shaft 7. The output shaft 7 drives the spool 3 at high speed through the main gear 14, pinion gear 16 and spool shaft 2.

For driving the spool 3 at low speed, the transmission switching mechanism 8 is operated to select the second transmission line. That is, the control element 81c is operated to disengage the restricting pawl 81b from the ratchet teeth 81a. This disengagement renders the gear holder 10 freely rotatable. When, in this state, the handle 4 is turned in the line winding direction, the differential gear 11 supported by the gear holder 10 rotates with the gear holder 10 round the first sun gear 6 and gives no transmission to the output shaft 7. As a result, the input shaft 5 rotating with the handle 4 is directly coupled to the output shaft 7 through the one-way rotation transmitting mechanism 82, thereby rotating the output shaft 7 without acceleration. The output shaft 7 drives the spool 3 through the main gear 14, pinion gear 16 and spool shaft 2, at the same speed as the rotation of the input shaft 5.

Figure 4:
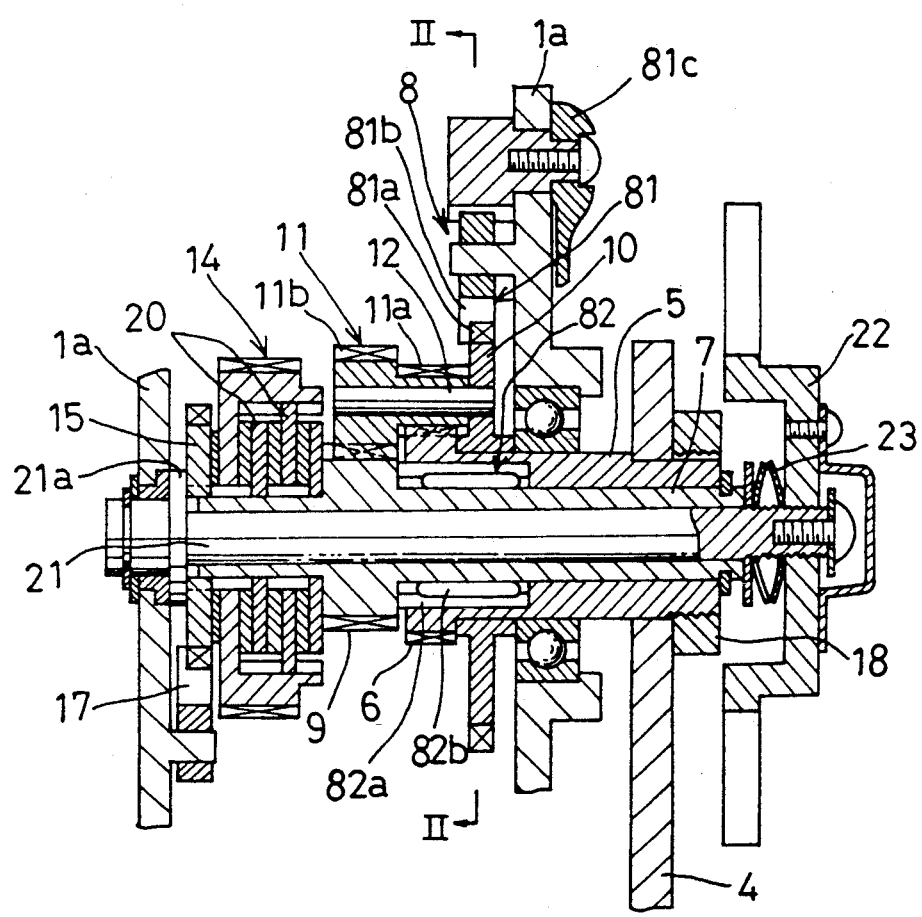
FIGS. 4 through 8 are sectional views showing accelerating systems in different embodiments.

FIG. 4 shows a second embodiment in which the main gear 14 is formed separately from the output shaft 7 as distinct from the first embodiment in which the two elements are formed integral. Specifically, the main gear 14 is rotatably supported on the output shaft 7, and a drag braking mechanism is provided between the main gear and output shaft 7 which includes a drag braking plate 20 for applying a braking force to the rotation of the main gear 14. In the second embodiment, a stationary shaft 21 is inserted into the output shaft 7, which has a collar 21a opposed to a side face of the backward rotation stopper gear 15. The stationary shaft 21 is attached at one end thereof to the side frame 1a, and carries a drag adjuster 22 at the other end. The output shaft 7 is axially movable by turning the drag adjuster 22, to press the drag braking plate 20 to apply a predetermined resistance and braking force to the rotation of the main gear 14. In the embodiment shown in FIG. 4, the other constructional features and functions are the same as in the first embodiment shown in FIGS. 1 through 3, and will not be described again. Numeral 23 in FIG. 4 denotes a plate spring.

Figure 5:
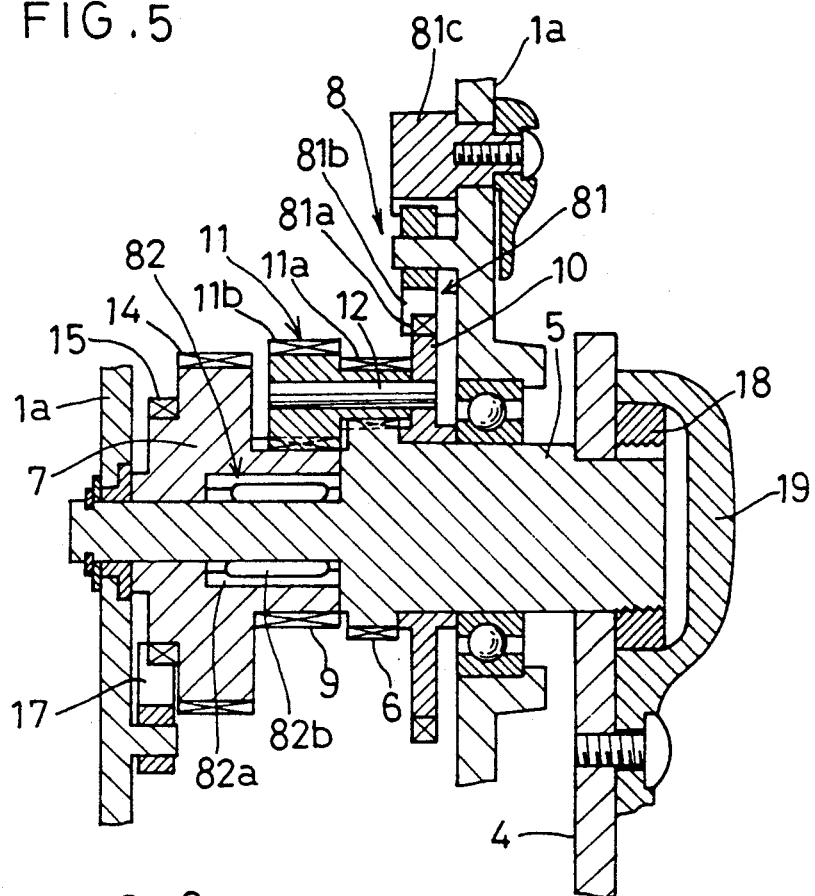
Figure 6:
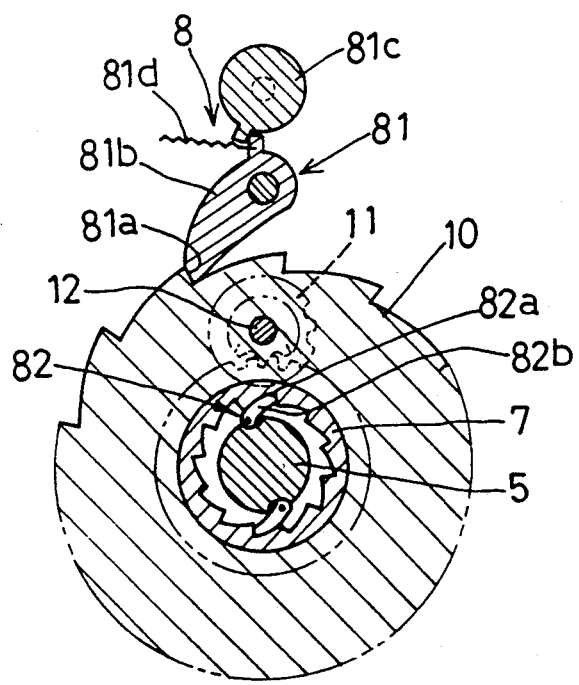

FIGS. 5 and 6 show a third embodiment in which the input shaft 5 comprises a solid and stepped shaft, and the output shaft 7 comprises a sleeve shaft. The output shaft 7 is rotatably supported on one end portion of the input shaft 5. The one-way rotation transmitting mechanism 82 is provided between an inner periphery of the output shaft 7 and an outer periphery of the input shaft 5, that is at an output side of the differential gear 11. The direction of the ratchet teeth 82a and transmission pawls 82b of the one-way rotation transmitting mechanism 82 in this embodiment is opposite to that in the embodiments shown in FIGS. 1 through 4. That is, the restricting pawl 81b of the restricting mechanism 81 engages one of the ratchet teeth 81a of the gear holder 10 to restrict rotation of the gear holder 10 (the first transmission line is selected). When the handle 4 is turned in the line winding direction, the output shaft 7 is rotated clockwise in FIG. 6 with acceleration relative to the input shaft 5. Therefore, where the transmission pawls 82b are attached to the input shaft 5 disposed inside and the ratchet teeth 82a are defined on the output shaft 7 disposed outside, the ratchet teeth 82a and transmission pawls 82b are directed opposite as noted above. In the third embodiment shown in FIGS. 5 and 6 also, the other constructional features and functions are the same as in the first embodiment shown in FIGS. 1 through 3, and will not be described again.

Figure 7:
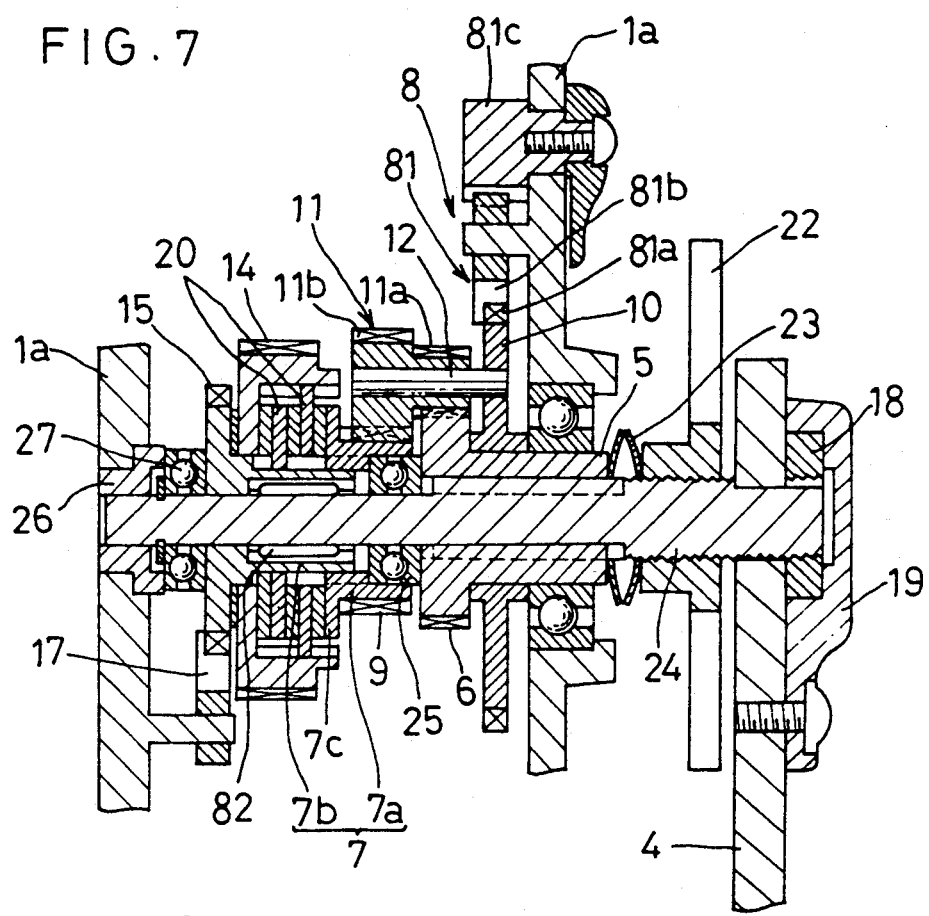
Figure 8:
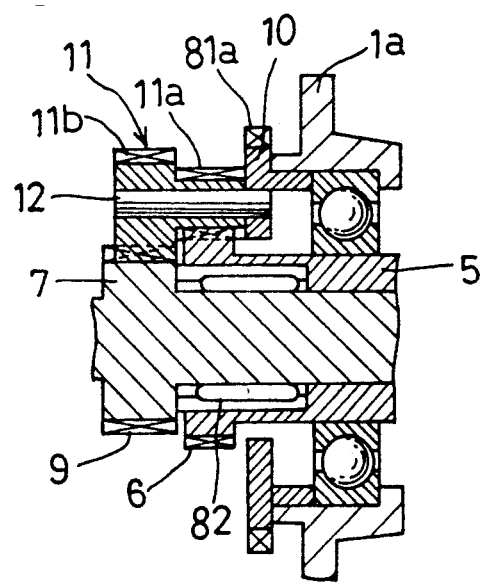

FIGS. 7 and 8 show a fourth embodiment in which a tubular input shaft 5 is rotatably supported by the side frame 1a and a handle shaft 24 is mounted in the tubular input shaft 5 to be relatively slidable but not relatively rotatable. The drag adjuster 22 is screwed to one end of the handle shaft 24, with a plate spring 23 mounted between the adjuster 22 and an end face of the input shaft 5. The output shaft 7 includes a first shaft 7a having the second sun gear 9 and an outwardly facing collar 7c, and a second shaft 7b carrying the drag braking plate 20 and integrally defining the backward rotation stopper gear 15. The first shaft 7a is mounted on the second shaft 7b to be relatively slidable but not relatively rotatable. The second shaft 7b is supported on the handle shaft 24 to be relatively rotatable and slidable. The one-way rotation transmitting mechanism 82 is provided between the second shaft 7b and handle shaft 24. The handle shaft 24 is directly connectable to the second shaft 7b, that is the second shaft 7b is directly connectable to the input shaft 5, through the one-way rotation transmitting mechanism 82. A thrust bearing 25 is mounted between an end face of the input shaft 5 and a stepped inside periphery of the first shaft 7a. A further thrust bearing 27 is mounted between an end face of the second shaft 7b and a bearing sleeve 26 attached to the side frame 1a. The other constructional features and functions are the same as in the first embodiment shown in FIGS. 1 through 3, and will not be described again.

According to this embodiment, the restricting pawl 81b of the restricting mechanism 81 engages one of the ratchet teeth 81a of the gear holder 10 to restrict rotation of the gear holder 10. That is, when the first transmission line is selected and the handle 4 is turned in the line winding direction, the input shaft 5 is rotated through the handle shaft 24. Then, the differential gear 11 is rotated through the first sun gear 6 of the input shaft 5. The output shaft 7 including the first shaft 7a and second shaft 7b is rotated with acceleration to an extent corresponding to the difference in the number of teeth between the toothed portions 11a and 11b of the differential gear 11. The output shaft 7 is smoothly rotated since the thrust bearing 25 is provided between the input shaft 5 and first shaft 7a. When the restricting pawl 81b of the restricting mechanism 81 is disengaged from the ratchet teeth 81a to render the gear holder 10 freely rotatable and the handle 4 is turned in the line winding direction, the differential gear 11 supported by the gear holder 10 rotates with the gear holder 10 round the first sun gear 6 and gives no transmission to the output shaft 7. As a result, the input shaft 5 is directly coupled to the second shaft 7b of the output shaft 7 through the handle shaft 24 and one-way rotation transmitting mechanism 82, thereby rotating the output shaft 7 without acceleration. By turning the drag adjuster 22, the drag braking plate 20 is pressed against the handle shaft 24 through the input shaft 5, thrust bearing 25, first shaft 7a and collar 7c, to apply a resistance to the rotation of the main gear 14.

In the above embodiments, the gear holder 10 is supported on the input shaft 5. However, as shown in FIG. 8, the gear holder 10 may be rotatably supported on the side frame 1a.

The restricting mechanism 81 has been described as including the ratchet teeth 81a, restricting pawl 81b and control element 81c. However, this construction is not limitative.

The one-way rotation transmitting mechanism 82 has been described as including the ratchet teeth 82a and transmission pawls 82b. This construction is not limitative, and the mechanism may comprise a cam surface and a roller, for example.

FIGS. 9 through 12 show embodiments that effect deceleration in a directly coupled state. In a fifth embodiment shown in FIGS. 9 through 11, the input shaft 5 rotatable by operating the handle 4 is rotatably supported by the side frame 1a and includes a first sun gear 60 formed integral with one end thereof. The input shaft 5 has the output shaft 7 rotatably fitted therein and carries a second sun gear 90 formed integral with an intermediate position and having a larger number of teeth than the first sun gear 60. The input shaft 5 carries a gear holder 10 relatively rotatably mounted thereon and rotatably supporting, through a pivotal shaft 12, a differential gear 110 defining toothed portions 110a and 110b having different numbers of teeth for meshing with the first sun gear 60 and second sun gear 90. A transmission switching mechanism 80 is formed for selecting between a first transmission line in which rotation of the gear holder 10 is restricted and transmitting drive with deceleration from the input shaft 5 through the differential gear 110 to the output shaft 7, and a second transmission line in which the gear holder 10 is restricted to be rotatable and directly coupling the input shaft 5 to the output shaft 7.

Specifically, the toothed portion 110a of the differential gear 110 meshed with the first sun gear 60 has a larger number of teeth than the toothed portion 110b meshed with the second sun gear 90. The transmission switching mechanism 80 includes a stopper mechanism 801 for restricting rotation of the gear holder 10 when the first transmission line is selected by the transmission switching mechanism 80, and a direct coupling mechanism 802 for directly coupling the input shaft 5 and output shaft 7 when the second transmission line is selected. The stopper mechanism 801 includes ratchet teeth 801a formed peripherally of the gear holder 10, and a restricting pawl 801b engageable with the ratchet teeth 801a. The stopper pawl 801b is pivoted to the side frame 1a, and the gear holder 10 is rotatable in the line winding direction, only rotation in the opposite direction being restricted. When the rotation of the gear holder 10 is restricted (i.e. when the first transmission line is selected), the differential gear 110 is rotated to transmit rotation of the input shaft 5 to the output shaft 7 with deceleration. A spring 801c is mounted between the stopper pawl 801b and side frame 1a for urging the stopper pawl 801b toward the ratchet teeth 801a.

The direct coupling mechanism 802 includes a ratchet gear 802a attached to an end of the output shaft 7, a transmission pawl 802b engageable with the ratchet gear 802a, and a control element 802c for controlling the transmission pawl 802b. The transmission pawl 802b is pivoted to the handle 4 and urged by a pawl spring 802d toward the ratchet gear 802a. The control element 802c is movably supported by a cover 28 attached to the handle 4, and is operable to directly couple and decouple the output shaft 7 to the input shaft 5 in the line winding direction. When the output shaft 7 is directly coupled to the input shaft 5, the differential gear 110 is revolvable, without rotating, with the gear holder 10 in the line winding direction, and the output shaft 7 is rotatable with the input shaft 5 also in the line winding direction.

Figure 9:
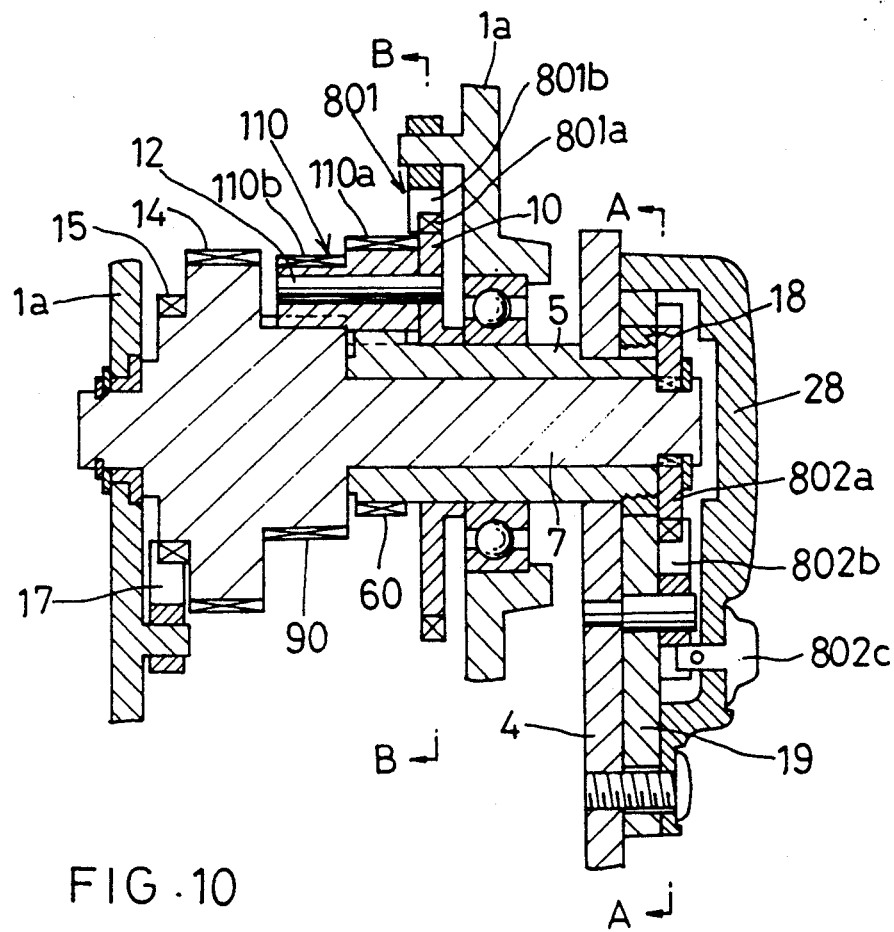
FIG. 9 is a sectional view of a principal portion of a decelerating system in one embodiment.
Figure 10:
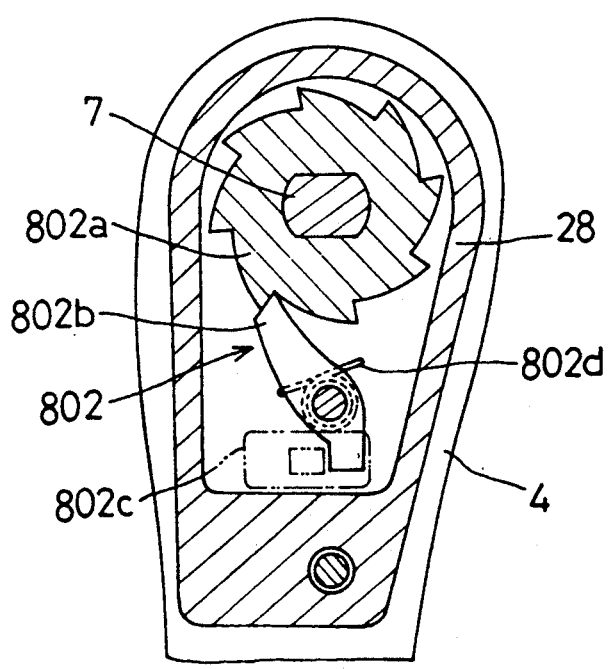
FIG. 10 is a section taken on line A—A of FIG. 9.
Figure 11:
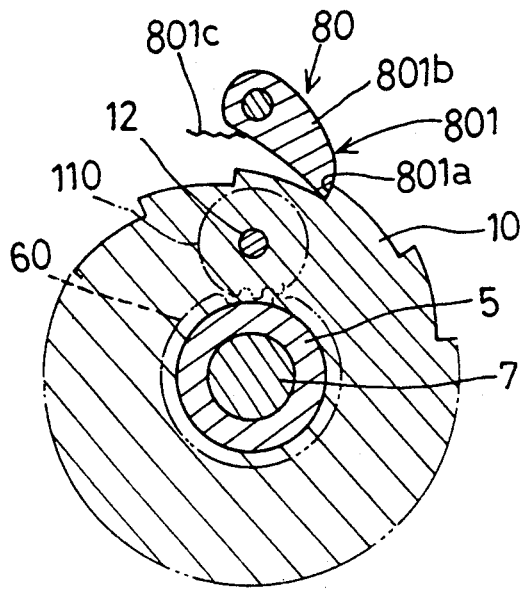
FIG. 11 is a section taken on line B—B of FIG. 9.

In the fifth embodiment shown in FIGS. 9 through 11, the output shaft 7 includes, formed integral with an end thereof, a main gear 14, and a backward rotation stopper gear 15. For driving the spool 3 at low speed in the fifth embodiment, the transmission switching mechanism 80 is operated to select the first transmission line. That is, the control element 802c is operated to disengage the transmission pawl 802b from the ratchet teeth 802a of the direct coupling mechanism 802. This disengagement renders the output shaft 7 rotatable relative to the input shaft 5. In this state, the handle 4 attached to an end of the input shaft 5 is turned in the line winding direction. Then the input shaft 5 is turned with the handle 4, and the differential gear 110 is rotated through the first sun gear 6 of the input shaft 5. The output shaft 7 is rotated with deceleration relative to the input shaft 5 to an extent corresponding to the difference in the number of teeth between the toothed portions 110a and 110b of the differential gear 110. At this time, the differential gear 110, while rotating, tends to revolve in the direction opposite to the rotation of the input shaft 5. However, the stopper pawl 801b engages the gear holder 10 supporting the differential gear 110, thereby restricting rotation of the gear holder 10 in the direction opposite to the line winding direction. The differential gear 110 therefore does not revolve. As a result, the rotation of the output shaft 7 is decelerated to drive the spool 3 at low speed.

For driving the spool 3 at the same speed by directly coupling the input shaft 5 and output shaft 7, the transmission switching mechanism 8 is operated to select the second transmission line. That is, the control element 802c is operated to engage the transmission pawl 802b with one of the ratchet teeth 802a. This engagement directly connects the output shaft 7 to the handle 4. In this state, the output shaft 7 is rotatable without deceleration. Turning of the handle 4 is directly transmitted to the input shaft 5, and through the transmission pawl 802b and ratchet gear 802a to the output shaft 7. Consequently, the gear holder 10 supporting the differential gear 110 rotates with the input shaft 5 and output shaft 7 in the line winding direction, with the differential gear 110 remaining out of rotation. As a result, the output shaft 7 drives the spool 3 through the main gear 14, pinion gear 16 and spool shaft 2, at the same speed as the rotation of the input shaft 5.

Figure 12:
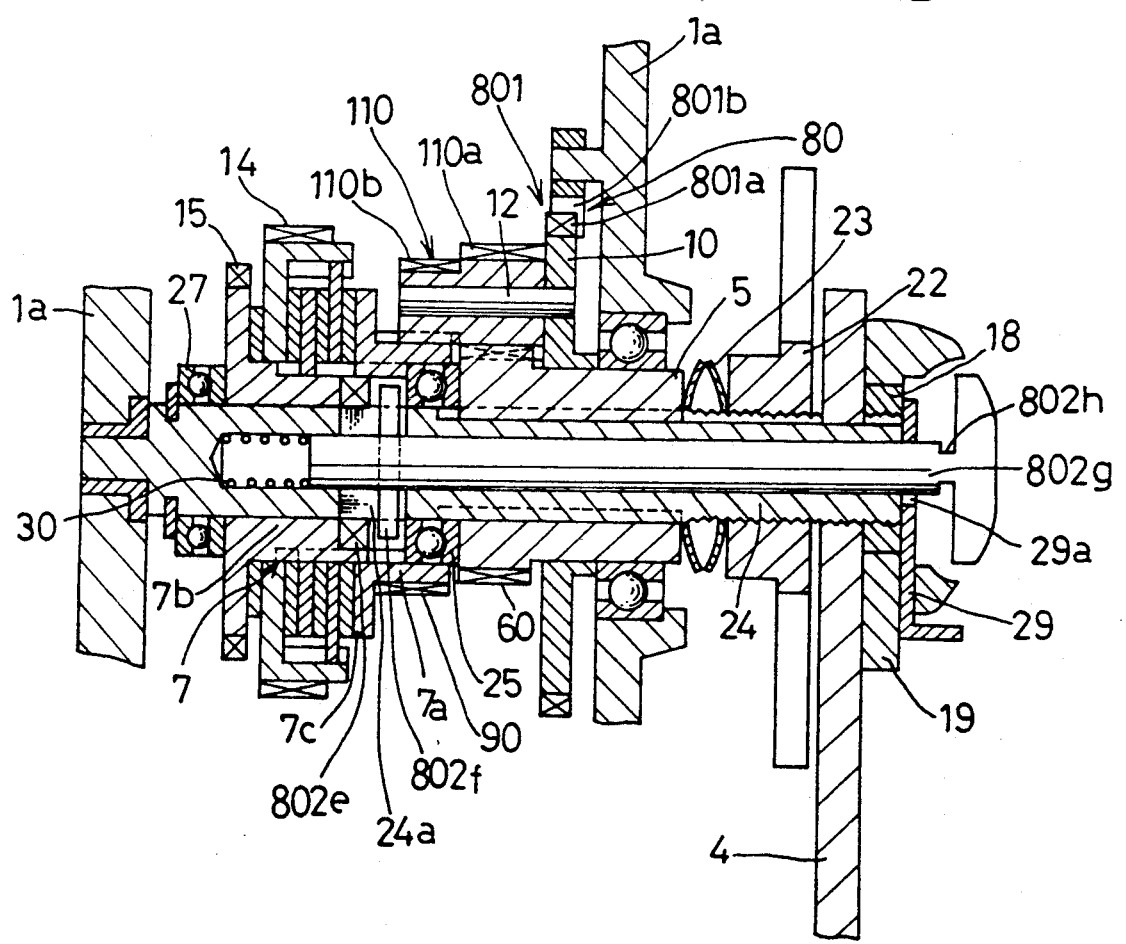
FIG. 12 is a sectional view of a decelerating system in another embodiment.

FIG. 12 shows a sixth embodiment which employs a decelerating system opposed to the accelerating system described with reference to FIG. 7. Specifically, a tubular input shaft 5 is rotatably supported by the side frame 1a and a handle shaft 24 is mounted in the tubular input shaft 5 to be relatively slidable but not relatively rotatable. The drag adjuster 22 is screwed to one end of the handle shaft 24, with a plate spring 23 mounted between the adjuster 22 and an end face of the input shaft 5. The output shaft 7 includes a first shaft 7a having a second sun gear 90 and an outwardly facing collar 7c, and a second shaft 7b carrying the drag braking plate 20 and integrally defining the backward rotation stopper gear 15. The first shaft 7a is mounted on the second shaft 7b to be relatively slidable but not relatively rotatable. The second shaft 7b is supported on the handle shaft 24 to be relatively rotatable and slidable. The transmission switching mechanism 80 has a direct coupling mechanism 802 including engaging recesses 802e, engaging projections 802f, and a control rod 802g inserted axially of the handle shaft 24 to be relatively slidable. A thrust bearing 25 is mounted between an end face of the input shaft 5 and a stepped inside periphery of the first shaft 7a. A further thrust bearing 27 is mounted between an end face of the second shaft 7b and a bearing sleeve 26 attached to the side frame 1a. A slot 24a extends radially of an intermediate position of the handle shaft 24 for movable receiving the engaging projections 802f. The handle 4 carries a rotation stopper 19 movably supporting a lever 29. The lever 29 defines a slot 29a for receiving the control rod 2g, and the slot 29a is engageable at one end thereof with an engaging member 802h provided on the control rod 802g to maintain the control rod 802g in a control position. Numeral 30 denotes a return spring for acting on the control rod 802g. The other constructional features and functions are the same as in the fifth embodiment shown in FIGS. 9 through 11, and will not be described again.

According to the sixth embodiment, when the transmission switching mechanism 80 is operated to select the first transmission line, i.e. the engaging projections 802f of the direct coupling mechanism 802 are disengaged from the engaging recesses 802e and the handle 4 is turned in the line winding direction, the input shaft 5 is rotated through the handle shaft 24. Then, the differential gear 110 meshed with the first sun gear 6 of the input shaft 5 is rotated. The output shaft 7 including the first shaft 7a and second shaft 7b is rotated with deceleration to an extent corresponding to the difference in the number of teeth between the toothed portions 110a and 110b of the differential gear 110. At this time, the differential gear 110, while rotating, tends to revolve in the direction opposite to the rotation of the input shaft 5. However, the stopper pawl 801b engages the gear holder 10 supporting the differential gear 110, thereby restricting rotation of the gear holder 10 in the direction opposite to the line winding direction. The differential gear 110 therefore does not revolve. As a result, the rotation of the output shaft 7 is decelerated to drive the spool 3 at low speed. The output shaft 7 is smoothly rotated since the thrust bearing 25 is provided between the input shaft 5 and second shaft 7b.

When the transmission switching mechanism 80 is operated to select the second transmission line, i.e. the control rod 802g is moved to engage the engaging projections 802f with the engaging recesses 802e, turning of the handle 4 is transmitted to the second shaft 7b of the output shaft 7 through the handle shaft 24 and the engaging projections 802f. As a result, the output shaft 7 is rotatable with the input shaft 5 without deceleration. Turning of the handle 4 is directly transmitted to the input shaft 5, and through the input shaft 5 and engaging projections 802f to the output shaft 7. Consequently, the gear holder 10 supporting the differential gear 110 rotates with the input shaft 5 and output shaft 7 in the line winding direction, with the differential gear 110 remaining out of rotation. As a result, the output shaft 7 drives the spool 3 through the main gear 14, pinion gear 16 and spool shaft 2, at the same speed as the rotation of the input shaft 5. By turning the drag adjuster 22, the drag braking plate 20 is pressed against the handle shaft 24 through the input shaft 5, thrust bearing 25 and first shaft 7a, to apply a resistance to the rotation of the main gear 14.

In the embodiments employing the decelerating system also, the gear holder 10 may be rotatably supported on the side frame 1a.

The stopper mechanism 801 and direct coupling mechanism 802 of the transmission switching mechanism 80 are not limited to the described constructions.

A plurality of differential gears 11 may be provided instead of one.

The change speed apparatus according to the present invention is used with a two-bearing reel for taking up the fishing line on the spool 3 as described. In addition, this apparatus may be applied to a spinning reel constructed to take up a fishing line on a spool by driving a rotatable frame.

What is claimed is:

1. A change speed apparatus for a fishing reel comprising:
   a plurality of sun gears having a different number of teeth,
   an input shaft carrying one of said sun gears and rotatable by a handle,
   an output shaft connected to a spool and carrying another sun gear,
   a differential gear including respective toothed portions having different number of teeth for meshing with respective outer perheries of said one and said another sun gears,
   a rotatably supported gear holder for supporting said differential gear,
   a first transmission line operative when rotation of said gear holder is restricted to transmit drive from said input shaft to said output shaft through said differential gear when a fishing line is wound on said spool in a fishing line winding direction, a second transmission line operative when said gear holder is rotatable to directly couple said input shaft and said output shaft when said fishing line is wound on said spool in said fishing line winding direction, and a transmission switching mechanism for selecting between said first transmission line and said second transmission line, said transmission switching mechanism being operative to restrict rotation of said gear holder when said first transmission line is selected, and removing a restriction on rotation of said gear holder when said second transmission line is selected, the selection between said first and second transmission line by said transmission switching mechanism determining the winding speed of line on said spool relative to the rotation speed of said handle.

2. A change speed apparatus for a fishing reel as claimed in claim 1, wherein said plurality of sun gears comprise a first sun gear and a second sun gear, the toothed portion meshed with said first sun gear having a smaller number of teeth than the toothed portion meshed with said second sun gear, whereby rotation of said input shaft is transmitted with acceleration to said output shaft when the first transmission line is selected by said transmission switching mechanism.

3. A change speed apparatus for a fishing reel as claimed in claim 2, wherein said transmission switching mechanism includes a one-way rotation transmitting mechanism for transmitting the rotation of said input shaft to said output shaft when the second transmission line is selected by said transmission switching mechanism.

4. A change speed apparatus for a fishing reel as claimed in claim 3, wherein said one-way rotation transmitting mechanism is provided between said input shaft and said output shaft, and includes ratchet teeth defined on an inner periphery of said input shaft, and transmission pawls engageable with said ratchet teeth.

5. A change speed apparatus for a fishing reel as claimed in claim 4, wherein said output shaft is operable to rotate a spool shaft through a main gear formed integral with said output shaft.

6. A change speed apparatus for a fishing reel as claimed in claim 3, wherein said output shaft is operable to rotate a spool shaft through a main gear formed separately from said output shaft.

7. A change speed apparatus for a fishing reel as claimed in claim 6, further comprising a drag mechanism provided between said main gear and said output shaft for applying a braking force to rotation of said main gear.

8. A change speed apparatus for a fishing reel as claimed in claim 3, wherein said input shaft comprises a solid and stepped shaft, said output shaft being a sleeve shaft rotatably supported on one end of said input shaft.

9. A change speed apparatus for a fishing reel as claimed in claim 3, wherein said input shaft comprises a sleeve shaft for receiving a handle shaft to be relatively slidable and relatively unrotatable, said handle shaft carrying a drag adjuster screwed to one end thereof.

10. A change speed apparatus for a fishing reel as claimed in claim 9, wherein said output shaft includes a first shaft having said first sun gear, and a second shaft mounted in said first shaft to be relatively slidable and relatively unrotatable, said second shaft being supported on said handle shaft to be relatively rotatable and slidable, said one-way rotation transmitting mechanism being provided between said handle shaft and said second shaft.

11. A change speed apparatus for a fishing reel as claimed in claim 10, wherein said gear holder is rotatably supported by a side frame forming part of a reel body.

12. A change speed apparatus for a fishing reel as claimed in claim 1, wherein said plurality of sun gears comprise a first sun gear and a second sun gear, the toothed portion meshed with said first sun gear having a larger number of teeth than the toothed portion meshed with said second sun gear, whereby rotation of said input shaft is transmitted with deceleration to said output shaft when the first transmission line is selected by said transmission switching mechanism.

13. A change speed apparatus for a fishing reel as claimed in claim 12, wherein said transmission switching mechanism includes a stopper mechanism for restricting rotation of said gear holder when the first transmission line is selected by said transmission switching mechanism, and a direct coupling mechanism for directly coupling said input shaft and said output shaft when the second transmission line is selected by said transmission switching mechanism.

14. A change speed apparatus for a fishing reel as claimed in claim 13, wherein said stopper mechanism includes ratchet teeth defined on an outer periphery of said gear holder, and a stopper pawl engageable with said ratchet teeth.

15. A change speed apparatus for a fishing reel as claimed in claim 13, wherein said direct coupling mechanism includes a ratchet gear attached to an end of said output shaft, a transmission pawl engageable with said ratchet gear, and a control element for controlling said transmission pawl.

16. A change speed apparatus for a fishing reel as claimed in claim 15, wherein said transmission pawl is pivoted to said handle and urged toward said ratchet gear by a pawl spring, said control element being movably supported by a cover attached to said handle for directly coupling and decoupling said input shaft and said output shaft in a fishing line winding direction.

17. A change speed apparatus for a fishing reel as claimed in claim 15, wherein said output shaft includes a main gear and a backward rotation stopper gear formed integral with one end thereof.

18. A change speed apparatus for a fishing reel as claimed in claim 13, wherein said input shaft comprises a sleeve shaft for receiving a handle shaft to be relatively slidable and relatively unrotatable, said handle shaft carrying a drag adjuster screwed to one end thereof.

19. A change speed apparatus for a fishing reel as claimed in claim 18, wherein said output shaft includes a first shaft having said second sun gear and an outwardly facing collar, and a second shaft supporting said drag braking plate and including a backward rotation stopper gear formed integral with said second shaft.

20. A change speed apparatus for a fishing reel as claimed in claim 19, wherein said direct coupling mechanism includes engaging recesses defined in one end of said second shaft, engaging projections engageable with said engaging recesses, and a control rod slidably mounted axially of said handle shaft.

* * * * *